United States Patent [19]

Kim

[11] Patent Number: 5,734,530
[45] Date of Patent: Mar. 31, 1998

[54] HEAD DRUM ASSEMBLY INCORPORATING THEREIN PARTS COATED WITH DIAMOND-LIKE CARBON

[75] Inventor: Keum-Mo Kim, Seoul, Rep. of Korea

[73] Assignee: Daewoo Electronics Co., Ltd., Seoul, Rep. of Korea

[21] Appl. No.: 573,832

[22] Filed: Dec. 18, 1995

[30] Foreign Application Priority Data

Dec. 27, 1994 [KR] Rep. of Korea ............... 1994-36239
Dec. 27, 1994 [KR] Rep. of Korea ............... 1994-37247

[51] Int. Cl.$^6$ ........................................... G11B 5/52
[52] U.S. Cl. ........................................ 360/107; 360/84
[58] Field of Search ................................ 360/107, 108, 360/109, 84

[56] References Cited

U.S. PATENT DOCUMENTS

| | | | |
|---|---|---|---|
| 4,875,110 | 10/1989 | Kazama et al. | 360/84 X |
| 4,935,303 | 6/1990 | Ikoma et al. | 428/408 |
| 4,972,283 | 11/1990 | Kim | 360/107 |
| 5,022,339 | 6/1991 | Baskin | 114/211 |
| 5,142,173 | 8/1992 | Konno et al. | 310/67 R |
| 5,482,602 | 1/1996 | Cooper et al. | 204/192.11 |
| 5,486,966 | 1/1996 | Ahn | 360/107 |
| 5,539,267 | 7/1996 | Fan et al. | 310/309 |

FOREIGN PATENT DOCUMENTS

| | | |
|---|---|---|
| 59-89823 | 5/1984 | Japan . |
| 7-37233 | 2/1995 | Japan . |

OTHER PUBLICATIONS

English Abstract of Japanese document 59-089823 (May/1984).

English Abstract of Japanese document 7-037233 (Feb./1995).

*Primary Examiner*—Jefferson Evans
*Assistant Examiner*—William R. Korzuch
*Attorney, Agent, or Firm*—Pennie and Edmonds, LLP

[57] ABSTRACT

A head drum assembly for use in a VCR includes a rotating shaft with a diamond-like carbon ("DLC") coating; a rotary drum fitted tightly around the rotating shaft; a stationary drum, fitting around the rotating shaft, and incorporating a set of DLC coated bearing surfaces; and an axial thrust bearing means. Such a head drum assembly allows smooth rotation by using herring-bone shaped grooves or protrusions in conjunction with DLC coatings in the appropriate bearing surfaces.

1 Claim, 7 Drawing Sheets

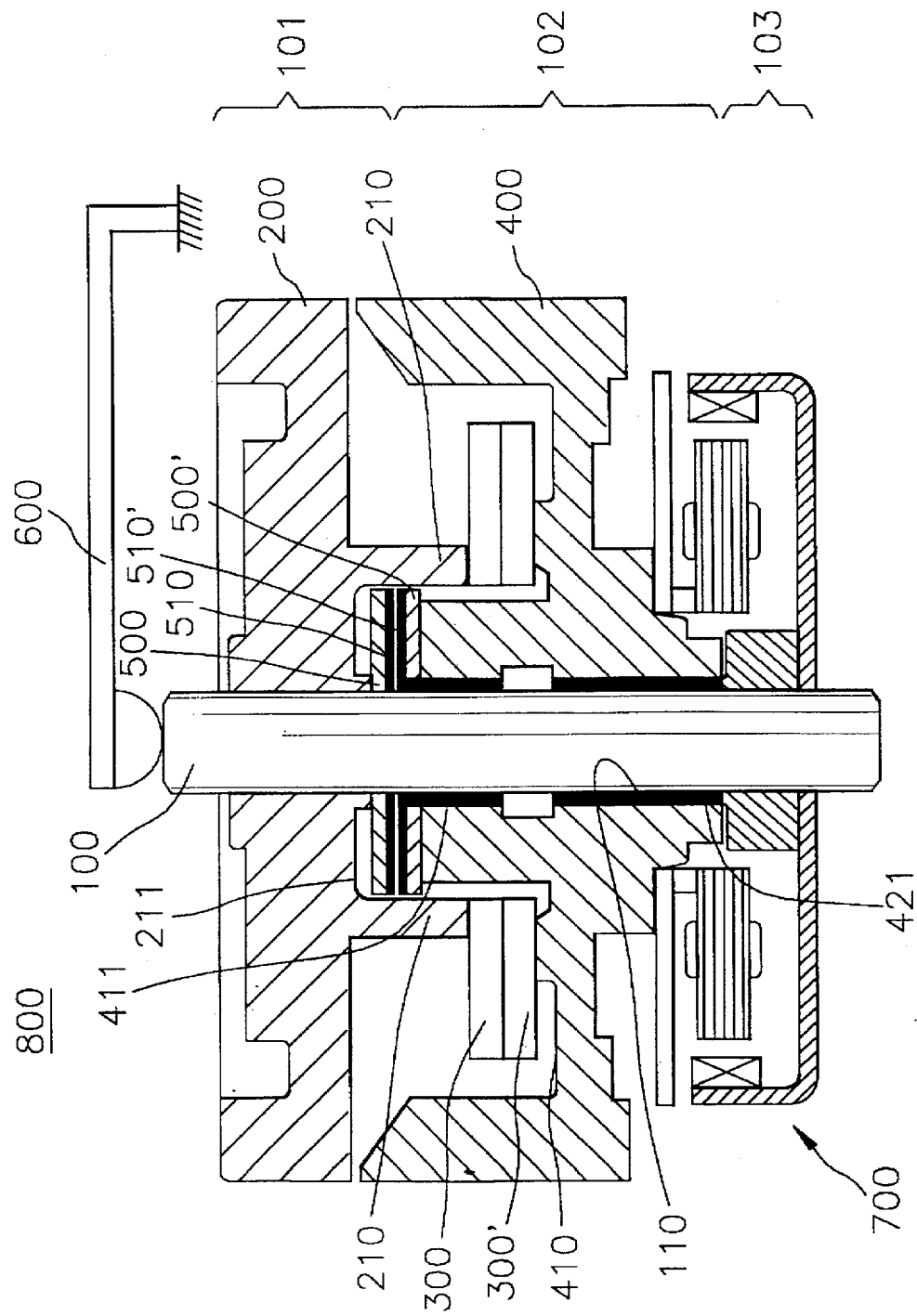

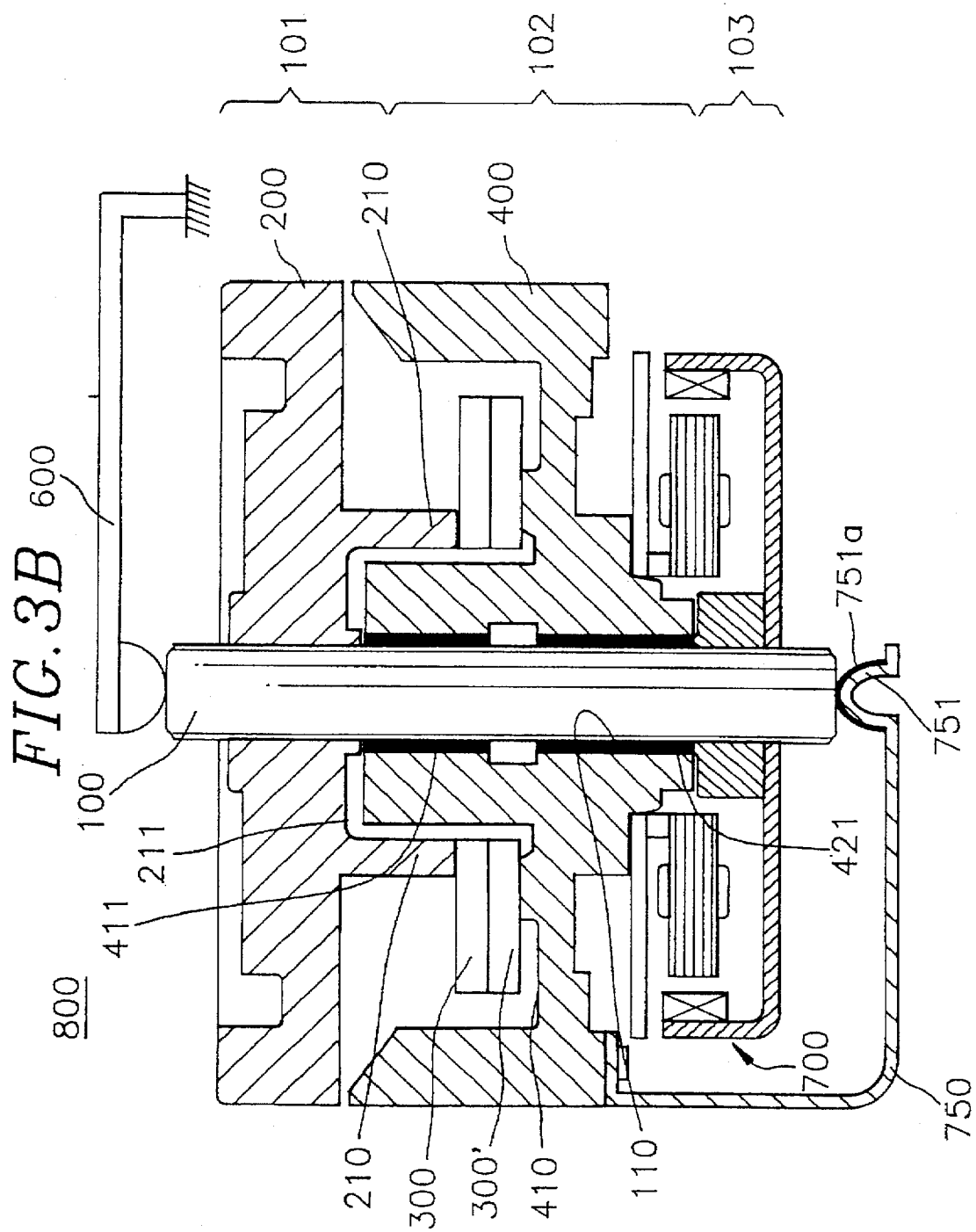

HEAD DRUM ASSEMBLY INCORPORATING THEREIN PARTS COATED WITH DIAMOND-LIKE CARBON

FIELD OF THE INVENTION

The present invention relates to a head drum assembly for use in a video cassette recorder ("VCR"); and, more particularly, to a head drum assembly capable of providing an improved rotatability in a rotary drum incorporated therein.

DESCRIPTION OF THE PRIOR ART

As is well known, a head drum assembly for use in a VCR comprises a plurality of moving parts, e.g., a rotary drum, and stationary parts, e.g., a stationary drum. Normally, the head drum assembly is broadly classified as either a ball bearing type or a sliding bearing type, depending on how the moving parts and the stationary parts are mechanically interrelated.

There is shown in FIG. 1 a conventional ball bearing type head drum assembly comprising: a rotating shaft 1 divided into an upper part 1a, a middle part 1b, and a motor attachment part 1c; a rotary drum 2 provided with a protruding annular portion on its bottom surface and a plurality of heads (not shown), and fitted tightly around the upper part 1a of the rotating shaft 1; two sets of ball bearings 5 arranged around the middle part 1b of the rotating shaft 1; a stationary drum 4 fitted around the two sets of ball bearings 5; a motor assembly 3 tightly fitted around the motor attachment part 1c of the rotating shaft 1; a rotor transformer 6 attached to the protruding annular portion on the bottom surface of the rotary drum 2; a stator transformer 7 installed on the stationary drum 4 and facing the rotor transformer 6 while maintaining a set distance therefrom; a thrust support bowl 8 attached to a bottom surface of a rim (not shown) of the stationary drum 4 and filled with a lubricant 9; and a thrust support knob 8a provided at the center of the thrust support bowl 8 and in contact with a bottom surface of the rotating shaft 1. The thrust support knob 8a and the two sets of ball bearings 5 placed between the rotating shaft 1 and the stationary drum 4 allow the rotating shaft If and hence the rotary drum 2 attached thereto, to rotate easily.

The thrust support bowl 8 and the thrust support knob 8a provided at the center thereof serve to maintain a predetermined separation between the rotary drum 2 and the stationary drum 4. Since the thrust support bowl 8 is fixed to the stationary drum 4, the thrust support knob 8a attached to the center of the thrust support bowl 8 prevents the rotating shaft 1 and the rotary drum 2 from moving too far down axially in relation to the stationary drum 4. This, in turn, prevents an occurrence of friction due to a direct contact between the rotary drum 2 and the stationary drum 4. To further facilitate an easy rotation of the rotating shaft 1 and the rotary drum 2, the thrust support knob 8a is made of a material with a low friction coefficient, e.g. a polished ruby, thus reducing its friction with the rotating shaft 1. In addition, the thrust support bowl 8 is filled up to a tip (not shown) of the thrust support knob 8a with the lubricant 9. The lubricant 9 reduces the friction between the rotating shaft 1 and the thrust support knob 8a even further.

Likewise, the ball bearings 5 arranged around the rotating shaft 1 serve to facilitate the rotation of the rotating shaft 1 and the rotary drum 2 in relation to the stationary drum 4. Since the stationary drum 4 and the rotating shaft 1 interact with each other only through the ball bearings 5 which are capable of rolling easily, the rotating shaft 1 can rotate in relation to the stationary drum 4 with a minimum of friction.

Although this design permits the rotating shaft 1 and the rotary drum 2 to rotate as intended, an irregularity in any one of the ball bearings 5 may give rise to vibrations and cause the rotary drum 2 to rotate in an irregular manner, affecting the ability of the heads attached thereto to read data stored on a magnetic tape, which will in turn adversely affect the performance of the VCR. In addition, this design demands a high level of precision during a manufacturing process thereof: if the two sets of ball bearings 5 are not aligned perfectly together, it is virtually impossible to insert the rotating shaft 1 therethrough.

Furthermore, the lubricant 9 held in the thrust support bowl 8 may contaminate the heads, leading to a deterioration of image quality. Also, the lubricant 9 that has to be poured into the thrust support bowl 8 must be carefully measured, lowering the production efficiency of the head drum assembly.

FIG. 2, on the other hand, illustrates a conventional sliding bearing type head drum assembly, comprising: a stationary shaft 10 provided with an upper portion 10a and a lower portion 10b, and a plurality of herring-bone shaped grooves or protrusions formed on the upper portion 10a thereof, thereby giving rise to a first set of bearing surfaces 11; a rotary drum 40 fitted around the upper portion 10a of the stationary shaft 10, and equipped with a second set of bearing surfaces 31 that match the first set of bearing surfaces 11; and a stationary drum 20 that fits tightly around the lower portion 10b of the stationary shaft 10. In addition, a thrust bearing 50, with herring-bone shaped grooves on its bottom surface 51, is attached to the rotary drum 40 and serves to constrain the rotary drum 40 from moving towards and coming in contact with the stationary drum 20.

As shown in FIG. 2, the rotary drum 40 and the stationary shaft 10 are in contact only through their respective bearing surfaces 31 and 11, allowing the rotary drum 40 to rotate easily around the stationary shaft 10. The rotatability of the rotary drum 40 is further enhanced by applying a lubricant between the first set of bearing surfaces 11 of the stationary shaft 10 and the second set of bearing surfaces 31.

The lubricant applied between the bearing surfaces 11 and 31 reduces friction between the rotary drum 40 and the stationary shaft 10. The lubricant lowers both a static friction coefficient and a dynamic friction coefficient during rotation between the stationary shaft 10 and the rotary drum 40. Thus, the lubricant allows easy rotation of the rotary drum 40 and also keeps the bearing surfaces 11 and 31 from abrading away when the rotary drum 40 is just beginning to rotate. During rotation, the herring-bone shaped grooves or protrusions serve to continuously draw in the lubricant into a space between the bearing surfaces 11 and 31 and thus further facilitate the rotation of the rotary drum 40.

The sliding bearing type head drum assembly is likely to provide more stable rotation of the rotary drum 40 in comparison with the ball bearing type head drum assembly, since the former does not make use of ball bearings, eliminating the instability problem of the rotary drum 40 due to vibrations caused by irregularities in the ball bearings.

However, as with the lubricant 9 used in the ball bearing type head drum assembly described above, the lubricant that is utilized between the bearing surfaces of the sliding bearing type head drum assembly may contaminate the heads, thus adversely affecting the performance of the VCR. Moreover, the amount of lubricant that has to be injected and applied between the bearing surfaces has to be carefully measured, thus lowering the production efficiency. The production efficiency is further lowered due to the fact that it is very difficult to form the herring-bone shaped grooves or protrusions on the bearing surfaces 11.

SUMMARY OF THE INVENTION

It is, therefore, a primary object of the present invention to provide a head drum assembly that is capable of overcoming the shortcomings of the ball bearing type and the sliding bearing type head drum assemblies mentioned above.

It is another object of the present invention to provide a head drum assembly with an improved stability in the rotation of a rotary drum incorporated therein.

In accordance with the present invention, there is provided a head drum assembly for use in a VCR comprising: a rotating shaft provided with a circumferential surface and divided into an upper part and a lower part; a rotary drum, fitted tightly around the upper part of the rotating shaft and furnished with a protruding annular portion on its bottom surface; a rotor transformer attached to the protruding annular portion of the rotary drum; a stationary drum rotatably fitted around the lower part of the rotating shaft and provided with a top surface and an annular depression therein; a stator transformer attached to a bottom surface of the annular depression on the top surface of the stationary drum; a DLC coating applied on the circumferential surface of the rotating shaft; a set of DLC coated surfaces provided on the stationary drum and coming in contact with the rotating shaft; and a thrust support bracket provided with a DLC coated protuberance at one end and attached to a bottom surface of a rim of the stationary drum.

BRIEF DESCRIPTION OF THE DRAWINGS

The above and other objects and features of the present invention will become apparent from the following description of preferred embodiments when taken in conjunction with the accompanying drawings, in which:

FIGS. 3A and 3B depict cross sectional views setting forth a head drum assembly in accordance with the present invention;

DETAILED DESCRIPTION OF THE PREFERRED EMBODIMENTS

Figure 1:
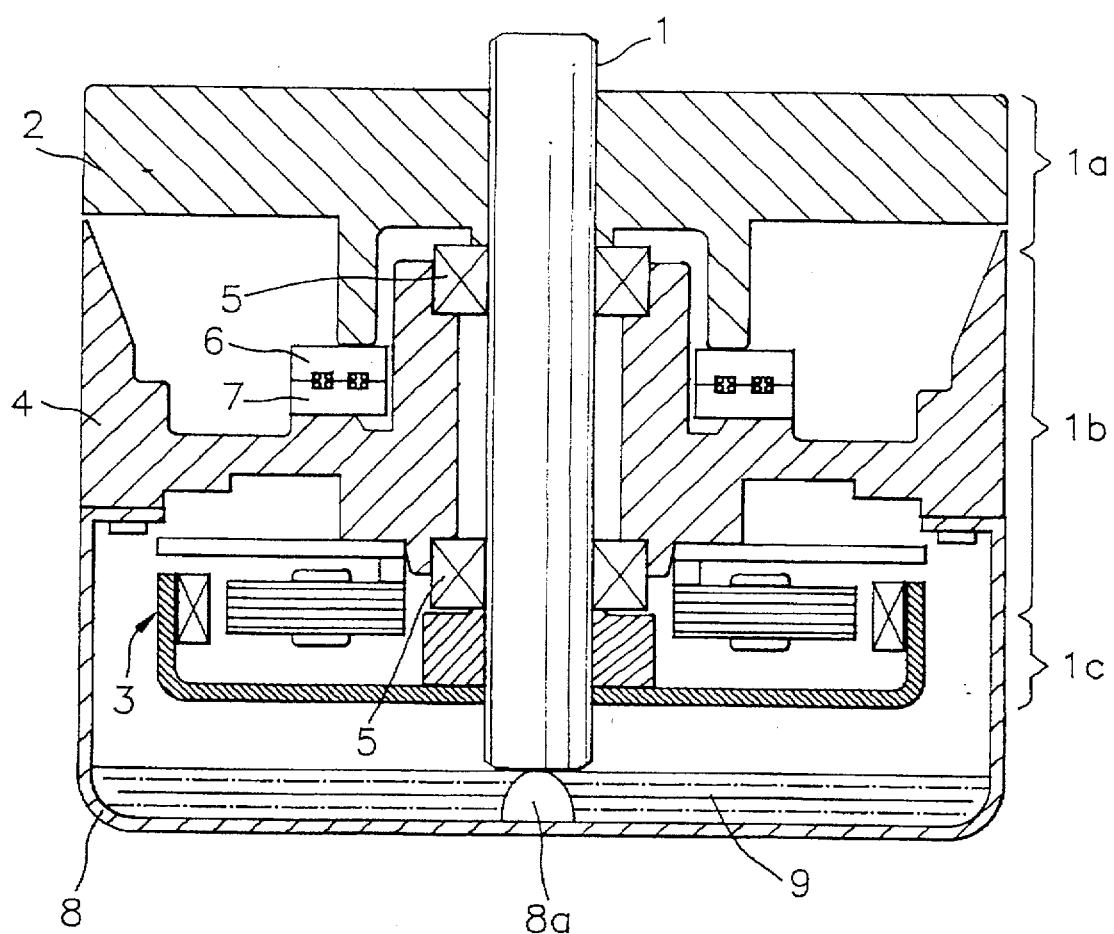
FIG. 1 shows a cross sectional view of a ball bearing type head drum assembly of prior art.
Figure 2:
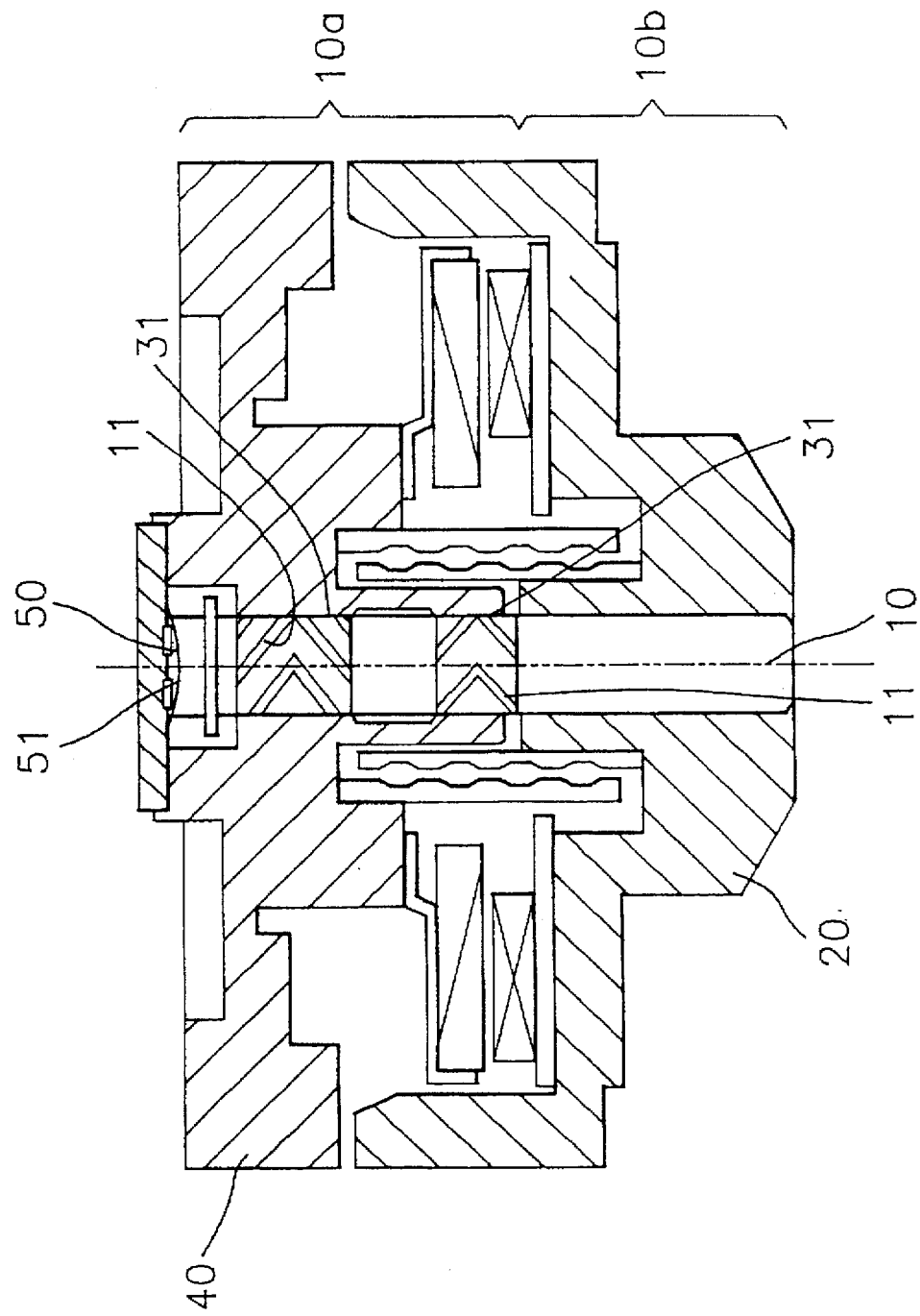
FIG. 2 illustrates a cross sectional view of a sliding bearing type head drum assembly of prior art.

Referring to FIG. 3A, there is shown an inventive head drum assembly 800 for use in a VCR in accordance with the present invention. The head drum assembly 800 comprises a rotating shaft 100 furnished with a DLC coating 110 on its circumferential surface (not shown); a rotary drum 200; a rotor transformer 300; a stator transformer 300'; a stationary drum 400 provided with an annular depression 410 and a pair of bearing surfaces 411 and 421; a ground plate 600; and a motor assembly 700.

As used herein, DLC shall mean a diamond-like carbon, as disclosed in U.S. Pat. No. 5,052,339, entitled "Radio Frequency Plasma Enhanced Chemical Vapor Deposition Process and Reactor", which is incorporated herein by reference.

The rotating shaft 100 is divided into an upper portion 101, a lower portion 102, and a motor attachment portion 103. The rotary drum 200, which is provided with a protruding annular portion 210 on its bottom surface, is fitted tightly around the upper portion 101 of the rotating shaft 100. The annular portion 210 encloses a central part 211 of the bottom surface of the rotary drum 200.

In the inventive head drum assembly 800, it is preferable to leave the parts of the rotating shaft 100 coming in contact with the rotary drum 200 uncoated. The DLC coating functions as an insulator, making it difficult to eliminate a static generated by the rotary drum 200 and the magnetic tape rubbing together. Leaving the parts of the rotating shaft 100 contacting the rotary drum 200 uncoated would facilitate the elimination of static through the use of the ground plate 600 as depicted in FIG. 3A.

Meanwhile, the stationary drum 400 is fitted around the lower portion 102 of the DLC coated rotating shaft 100. The bearing surfaces 411 and 421 of the stationary drum 400 coming in contact with the rotating shaft 100 are coated with the DLC. Finally, the motor assembly 700, which rotates the rotating shaft 100 in relation to the stationary drum 400, is fitted tightly around the motor attachment portion 103 of the rotating shaft 100.

In addition, in order to reduce the friction between the upper part and the lower part of the head drum assembly, an upper thrust plate 500 and a lower thrust plate 500' are installed on the central part 211 of the bottom surface of the rotary drum 200 and the top surface of the axial part of the stationary drum 400, respectively, as a means of bearing axial load. The thrust plates 500 and 500' prevent other surfaces of the rotary drum 200 and the stationary drum 400 from being in direct contact with each other by keeping the rotating shaft 100 and the rotary drum 200 from moving too far down axially. To minimize the friction between the thrust plates themselves, a side 510 of the upper thrust plate 500 and a side 510' of the lower thrust plate 500' that are facing each other are coated with the DLC.

The thrust plates 500 and 500' also serve to maintain a set distance between the rotor transformer 300 and the stator transformer 300', which are installed on the protruding annular portion 210 of the rotary drum 200 and a bottom surface of the annular depression 410 of the stationary drum 400, respectively.

FIG. 3B illustrates another embodiment of the present invention, wherein a thrust support bracket 750 is employed instead of the thrust plates 500, 500' to prevent the rotary drum 200 from coming in contact with the stationary drum 400. The thrust support bracket 750 is affixed to a bottom surface of a rim (not shown) of the stationary drum 400, and is provided with a protuberance 751 at one end. The protuberance 751 is equipped with a DLC coating 751a, and is in contact with a DLC coated bottom surface of the rotating shaft 100. As with the thrust plates 500, 500', the thrust support bracket 750 and the DLC coated protuberance 751 prevent the rotating shaft 100 and the rotary drum 200 from moving too far down axially.

Alternatively, it is also possible to coat only the protuberance 751 or the bottom of the rotating shaft 100 with the DLC and keep the other uncoated. The DLC is effective enough at reducing friction that only one of the two surfaces that are in contact with each other needs to be coated with the DLC.

Figure 4A:
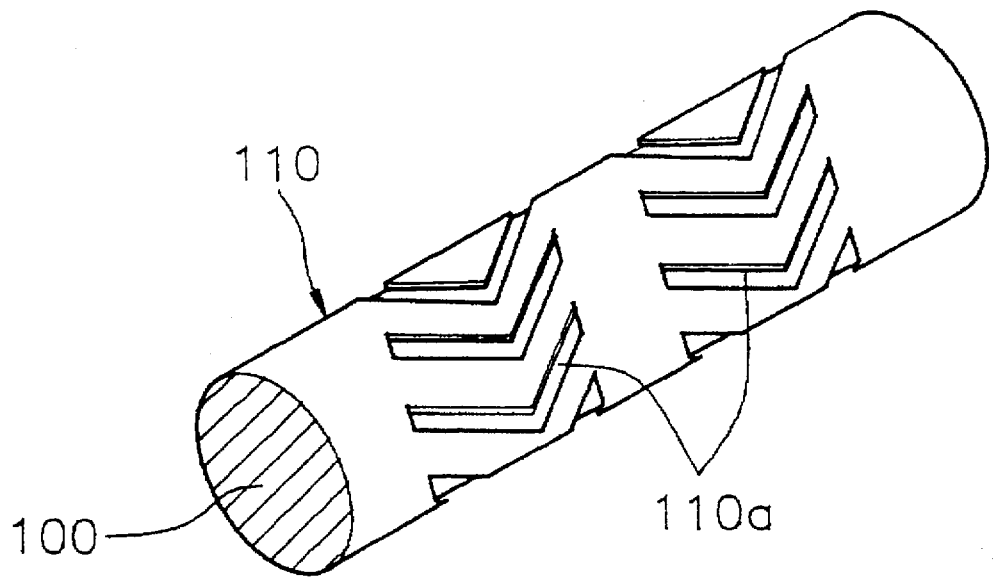
FIGS. 4A and 4B provide perspective views illustrating a DLC coated rotating shaft with herring-bone shaped grooves and protrusions, respectively, in accordance with the present invention.
Figure 4B:
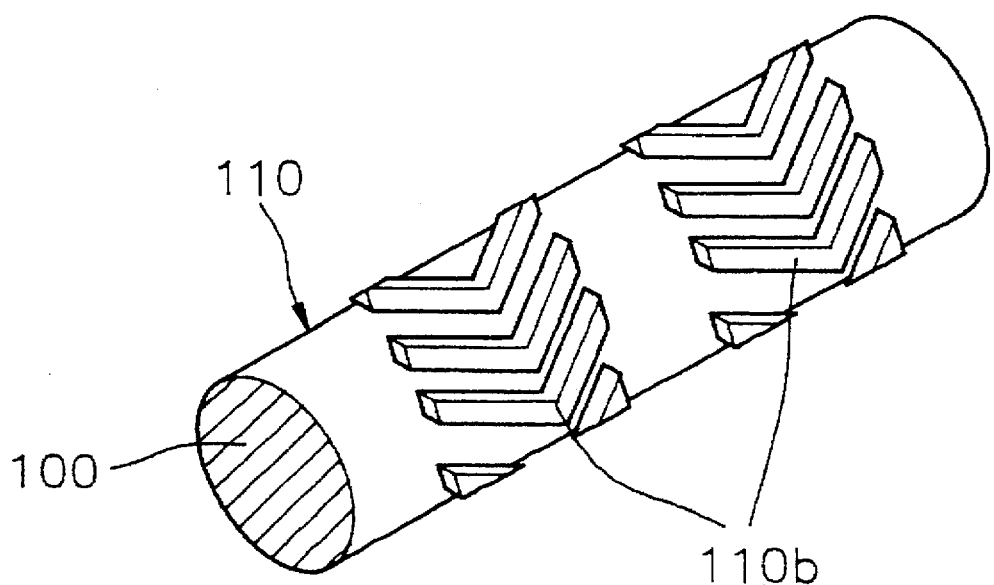

The rotatability of the rotary drum 200 is also improved due to the fact that the stationary drum 400 is rotatably fitted around the rotating shaft 100 with contact between these two components occurring only through the DLC coated bearing surfaces 411, 421 and the DLC coating 110. Thus, as the DLC coated surfaces have small frictional coefficients, the rotating shaft 100 and the rotary drum 200 can easily, and with a minimum of friction, rotate in relation to the stationary drum 400. To further reduce the friction between the rotating shaft 100 and the stationary drum 400, the DLC coating 100 around the rotating shaft 100 may be provided with either a set of herring-bone shaped grooves 110a or a set of herring-bone shaped protrusions 110b, as shown in FIGS. 4A and 4B. The air that flows through the grooves 110a, or between the protrusions 110b, creates an air layer between the rotating shaft 100 and the DLC coated bearing surfaces 411, 421. Thus, a direct contact, and consequently the friction, between the rotating shaft 100 and the stationary drum 400 is reduced.

Figure 5A:
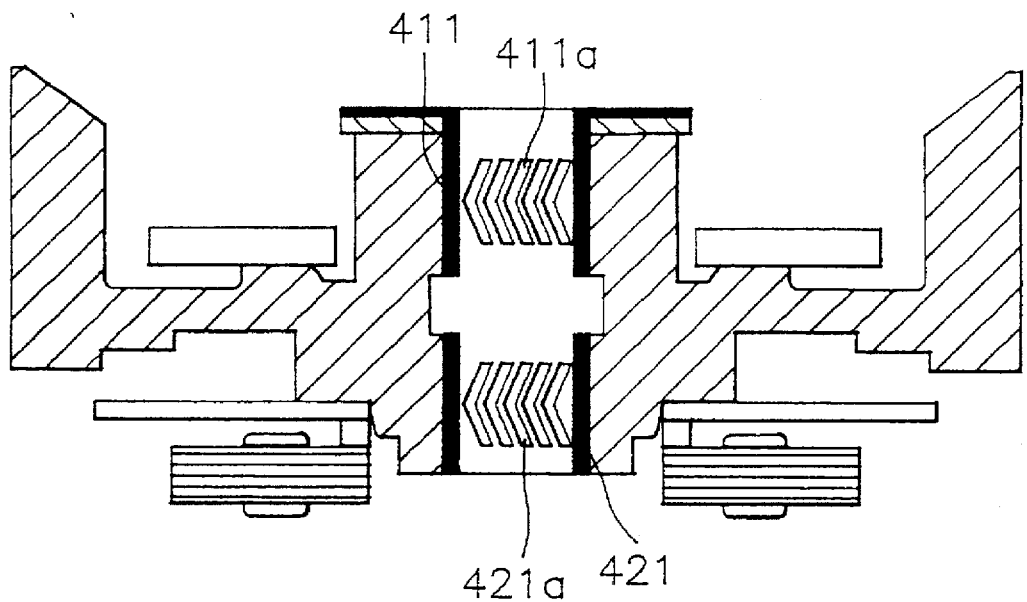
FIGS. 5A and 5B offer cut away views of a stationary drum with herring-bone shaped grooves and protrusions, respectively, on its DLC coated bearing surfaces, in accordance with the present invention.
Figure 5B:
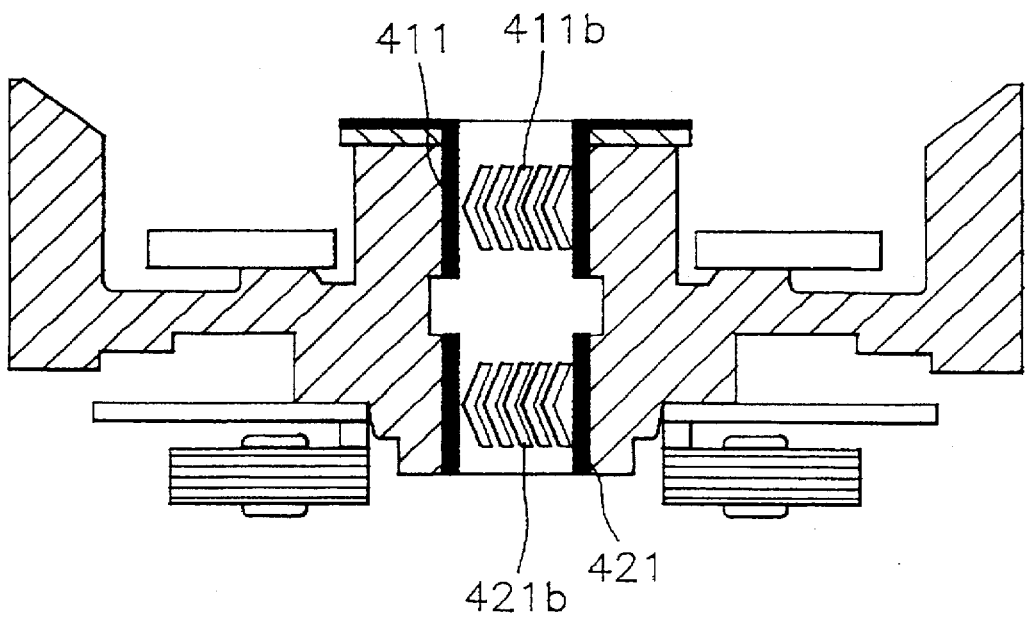

FIGS. 5A and 5B illustrate yet another preferred embodiment of the invention, wherein the DLC coating 110 around the rotating shaft 100 is kept smooth, and the DLC coated bearing surfaces 411 and 421 of the stationary drum 400 are provided with a set of herring-bone shaped grooves 411a and 421a or a set of herring-bone shaped protrusions 411b and 421b. The effect of these herring-bone shaped grooves or protrusions is the same, however, as they still serve to create an air layer between the rotating shaft 100 and the stationary drum 400 that reduces friction.

In still another embodiment of the present invention, only the rotating shaft 100 or the bearing surfaces 411, 421 of the stationary drum 400 are coated with the DLC. Since, as expounded below, a frictional coefficient between a DLC coated surface and a steel surface is comparable to the static frictional coefficient between a lubricated copper surface and the steel surface, it is possible to provide a head drum assembly with the rotatability comparable to that of the conventional sliding bearing type head assembly without using the lubricant. In such a head assembly according to still another embodiment of the present invention, the DLC coating, whether it is incorporated around the rotating shaft 100 as shown in FIGS. 4A, 4B, or on the bearing surfaces 411, 421 of the stationary drum 400 as illustrated in FIGS. 5A, 5B, is provided with either herring-bone shaped grooves or protrusions.

In conventional head drum assemblies, reducing the friction between a rotating shaft and a stationary drum by means of air layers was impractical as the friction coefficient between the stationary drum and the rotating shaft was too high. Thus, at times when the rotating shaft is not rotating fast enough to generate an adequate air layer, the rotating shaft and the stationary drum would rub against each other and abrade away. In particular, the static friction coefficient between conventional uncoated rotating shafts and stationary drums is relatively high, and unless a lubricant is applied between them, it could damage the rotating shaft and the stationary drum when the rotating shaft begins rotating from a resting state.

The static friction coefficients between two surfaces for a number of different materials are compared in Table 1.

As can be seen from Table 1, the static friction coefficient between the DLC coated surface and the steel surface is comparable to the static friction coefficient between the lubricated copper surface and the steel surface. Thus, by coating the appropriate parts of the rotating shaft and the stationary drum with the DLC, it is possible to dispense with the lubricant. Even when there is no friction reducing air layer between the DLC coated rotating shaft and the DLC coated stationary drum, the static friction coefficient between them is low enough to allow the rotating shaft to rotate easily.

TABLE 1

| Composition of Surfaces | Static Friction Coefficient |
| --- | --- |
| Aluminum/Steel | 0.50 |
| Copper/Steel | 0.35 |
| Copper/Steel + lubricant | 0.11–0.19 |
| DLC/Steel | 0.14 |

Likewise, the use of the DLC coating 751a on the protuberance 751 prepared at one end of the thrust support bracket 750, or the bottom surface of the rotating shaft 100, makes unnecessary the use of lubricant to reduce friction with the bottom surface of the rotating shaft 100. In addition, coating both the protuberance 750 and the rotating shaft 100 with the DLC could improve the rotatability of the rotary drum 200 even more.

Figure 6:
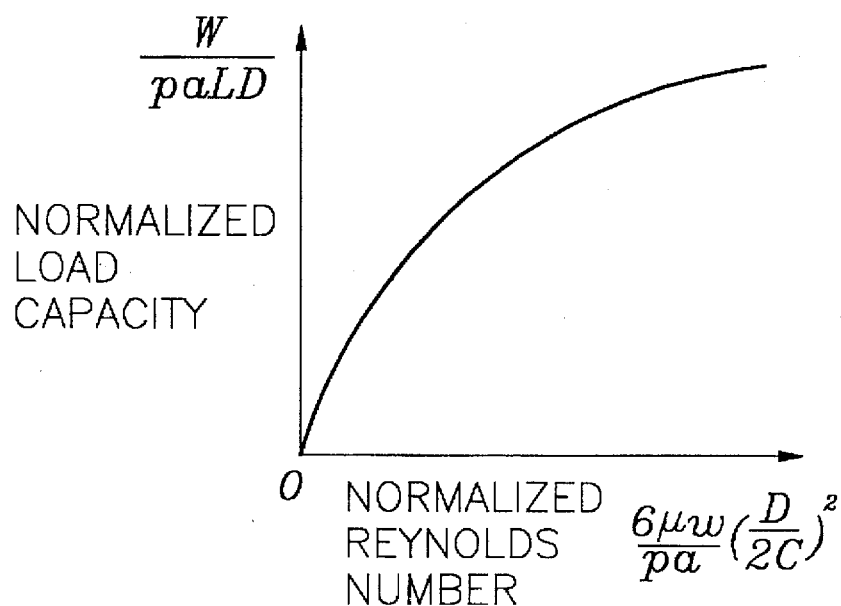
FIG. 6 sets forth a distribution chart demonstrating the load bearing capacity of the air layer between the rotating shaft and bearing surfaces of the stationary drum.

As illustrated in FIG. 6, when an air layer is present between the bearing surfaces of the rotating shaft and the stationary drum, the load capacity of this air layer can be expressed by a relation derived from the Reynolds equation, which is well known and widely used in the field of hydrodynamic lubrication:

$$W/PaLD \propto 6\mu w/Pa \, (D/2C)^2$$

wherein W is the load capacity, Pa is the atmospheric pressure, L is the length of the bearing surface, D is the diameter of the rotating shaft plus the thickness of the DLC coating on the shaft, $\mu$ is the air viscosity factor, w is the angular velocity of the rotating shaft and C is the gap between the bearing surfaces on the stationary drum and the bearing surfaces of the rotating shaft.

It can be seen from this relation that given a rotating shaft of a fixed diameter, a particular load capacity can be reached by choosing adequate values for the length of the bearing surfaces and the gap between the bearing surfaces of the rotating shaft and the stationary drum.

Figure 7:
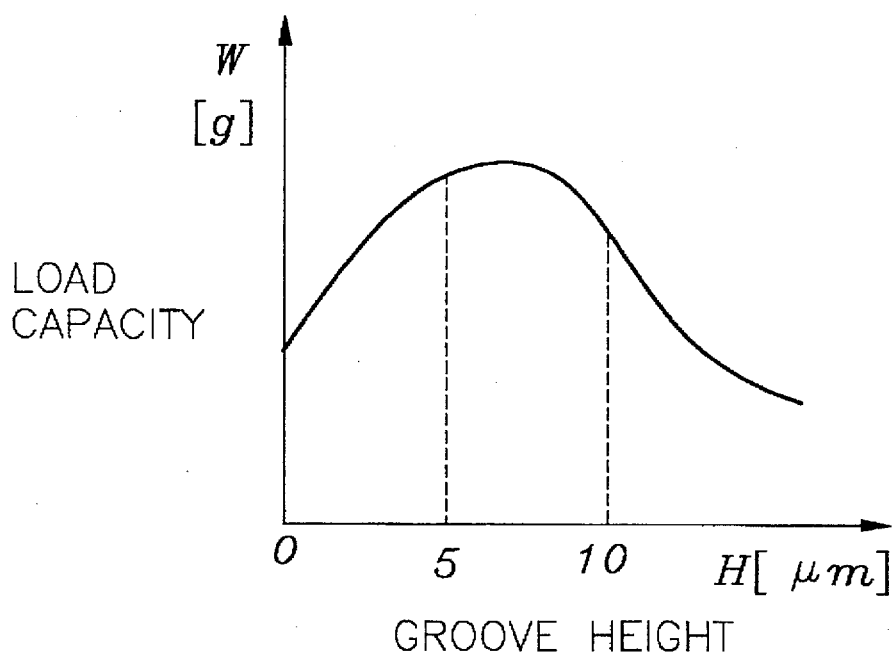
FIG. 7 presents a distribution chart explaining the load bearing capacity of the air layer as a function of the depth or height of the herring-bone structures.

FIG. 7 presents the relationship between the depth and height of the herring-bone shaped structures, and the load capacity of the air layer. As shown in FIG. 7, the load capacity of the air layer is maximized when the depth or height of the herring-bone shaped grooves or protrusions is in a 5–10 μm range.

As set forth above, the head drum assembly 800 in accordance with the present invention is less likely to wear and tear or malfunction during the operation of the VCR due to defective ball bearings or lubricant contamination of the heads. The present head drum assembly 800 achieves a smooth rotation by utilizing the herring-bone shaped grooves or protrusions in conjunction with the DLC coatings in the appropriate bearing surfaces.

The present invention has the added advantage that the formation of the herring-bone shaped grooves or protrusions, either on the rotating shaft 100 or on the bearing surfaces 411, 421, can be accomplished relatively easily through a masking operation during the coating process. In contrast, herring-bone shaped grooves or protrusions on conventional rotating shafts or stationary drums have to be worked into the shaft or the drum proper, greatly complicating the manufacturing process thereof.

In addition, the present invention further lowers a manufacturing cost of the head drum assembly by dispensing with the need to carefully measure and apply the lubricant and with the need to provide a thrust support knob made of an expensive material, e.g. a polished ruby.

While the present invention has been shown and described with reference to the particular embodiments, it will be apparent to those skilled in the art that many changes and modifications may be made without departing from the spirit and scope of the invention as defined in the appended claims.

What is claimed is:

1. A head drum assembly for use in a video cassette recorder ("VCR") comprising:

a rotating shaft having a coated portion having a diamond-like carbon coating; and an uncoated portion;

a rotary drum fitted tightly around the uncoated portion, said rotary drum having a protruding annular portion on its bottom surface;

a rotor transformer attached to the protruding annular portion of the rotary drum;

a stationary drum rotatably fitted around the coated portion and provided with an annular depression, a protruding portion and a pair of bearing surfaces;

a stator transformer attached to a bottom surface of the annular depression of the stationary drum and facing the rotor transformer, said stator transformer being spaced apart from said rotor transformer by a set distance; and axial thrust means connected to said assembly and arranged to maintain said set distance between the rotor transformer and the stator transformer, said axial thrust means comprising an upper thrust plate fixed to a central part of the bottom surface of the rotary drum and a lower thrust plate fixed to the top surface of the protruding portion of the stationary drum opposite the upper thrust plate, facing sides of each thrust plate coming into contact with each other, wherein one of the upper and the lower thrust plates is coated with diamond-like carbon.

\* \* \* \* \*